United States Patent
Oh et al.

(10) Patent No.: US 10,656,480 B2
(45) Date of Patent: May 19, 2020

(54) TRANSMITTANCE-VARIABLE FILM

(71) Applicant: LG Chem, Ltd., Seoul (KR)

(72) Inventors: Dong Hyun Oh, Daejeon (KR); Jung Sun You, Daejeon (KR); Eun Jung Lim, Daejeon (KR); In Ju Mun, Daejeon (KR); Kyung Ki Hong, Daejeon (KR); Kum Suek Seo, Daejeon (KR); Hyo Jin Lee, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 16/080,158

(22) PCT Filed: Apr. 14, 2017

(86) PCT No.: PCT/KR2017/004060
§ 371 (c)(1),
(2) Date: Aug. 27, 2018

(87) PCT Pub. No.: WO2017/179940
PCT Pub. Date: Oct. 19, 2017

(65) Prior Publication Data
US 2019/0049641 A1  Feb. 14, 2019

(30) Foreign Application Priority Data
Apr. 14, 2016  (KR) .................. 10-2016-0045629

(51) Int. Cl.
*G02F 1/1347* (2006.01)
*G02B 5/30* (2006.01)
(Continued)

(52) U.S. Cl.
CPC ........... *G02F 1/13475* (2013.01); *G02B 5/30* (2013.01); *G02B 27/017* (2013.01); *G02B 30/00* (2020.01);
(Continued)

(58) Field of Classification Search
CPC ........ G02F 2001/133773; G02F 2001/133742; G02F 2001/133746; G02F 1/13475;
(Continued)

(56) References Cited

U.S. PATENT DOCUMENTS 4,396,250 A   8/1983  Wada et al.
4,460,248 A   7/1984  Shirai
(Continued)

FOREIGN PATENT DOCUMENTS

CN   102854650 A   1/2013
JP   S55166619 A   12/1980
(Continued)

OTHER PUBLICATIONS

Search report from International Application No. PCT/KR2017/004060, dated May 29, 2017.
(Continued)

*Primary Examiner* — Jia X Pan
(74) *Attorney, Agent, or Firm* — Lerner, David, Littenberg, Krumholz & Mentlik, LLP

(57) ABSTRACT

A transmittance-variable film and the use thereof are provided. The transmittance-variable film can be useful in switching between a clear state and a dark state and reducing a difference in contrast ratio between left and right viewing angles, thereby securing excellent bilateral symmetry. Such a transmittance-variable film can be applied to various applications including various materials for buildings or vehicles requiring the control of transmissivity, or eyewear such as goggles for sports or experiencing augmented realities, sunglasses, helmets, etc.

9 Claims, 7 Drawing Sheets

(51) Int. Cl.
*G02C 7/10* (2006.01)
*G02B 27/01* (2006.01)
*G02B 30/00* (2020.01)
*G02F 1/1337* (2006.01)
*G02F 1/137* (2006.01)

(52) U.S. Cl.
CPC .......... *G02C 7/101* (2013.01); *G02F 1/1337* (2013.01); *G02B 2027/0178* (2013.01); *G02F 1/13725* (2013.01); *G02F 2001/13712* (2013.01); *G02F 2001/133742* (2013.01); *G02F 2001/133746* (2013.01); *G02F 2202/04* (2013.01)

(58) Field of Classification Search
CPC ............ G02F 1/13737; G02F 1/13725; G02F 1/1337; G02F 2001/13712; C09K 19/60; G02B 30/00; G02B 27/017; G02B 2027/0178; G02C 7/101
See application file for complete search history.

(56) References Cited

U.S. PATENT DOCUMENTS

| | | | | |
|---|---|---|---|---|
| 5,943,104 | A * | 8/1999 | Moddel | G02C 7/101 349/120 |
| 6,707,515 | B1 | 3/2004 | Ide et al. | |
| 2001/0002153 | A1 | 5/2001 | Yano | |
| 2008/0094557 | A1 * | 4/2008 | Kuiper | G02F 1/133371 349/123 |
| 2012/0212399 | A1 * | 8/2012 | Border | G02B 27/017 345/8 |
| 2015/0205023 | A1 | 7/2015 | Seo et al. | |
| 2016/0070132 | A1 | 3/2016 | Soto et al. | |
| 2016/0085108 | A1 * | 3/2016 | Junge | G02F 1/1337 349/16 |
| 2016/0091715 | A1 * | 3/2016 | Larson | G02B 27/0101 348/53 |
| 2016/0109712 | A1 | 4/2016 | Harrison et al. | |
| 2016/0291357 | A1 | 10/2016 | Min et al. | |
| 2017/0276960 | A1 * | 9/2017 | Osterman | G02C 7/022 |

FOREIGN PATENT DOCUMENTS

| | | |
|---|---|---|
| JP | S5737329 A | 3/1982 |
| JP | S60159725 A | 8/1985 |
| JP | S60211428 A | 10/1985 |
| JP | 2004333567 A | 11/2004 |
| JP | 2005173493 A | 6/2005 |
| JP | 2008174717 A | 7/2008 |
| JP | 2013545130 A | 12/2013 |
| KR | 20000068650 A | 11/2000 |
| KR | 20010007255 A | 1/2001 |
| KR | 20070099637 A | 10/2007 |
| TW | 201422647 A | 6/2014 |
| TW | 201602678 A | 1/2016 |
| WO | 2015133878 A1 | 9/2015 |

OTHER PUBLICATIONS

Search report from Office Action from TW Application No. 201706112541 dated Feb. 21, 2018.
Extended European Search Report including Written Opinion for European Application No. 17782695.5, dated Mar. 15, 2019.

* cited by examiner

[FIG. 1]
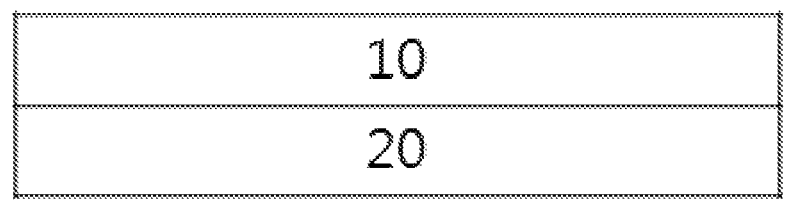
[FIG. 2]
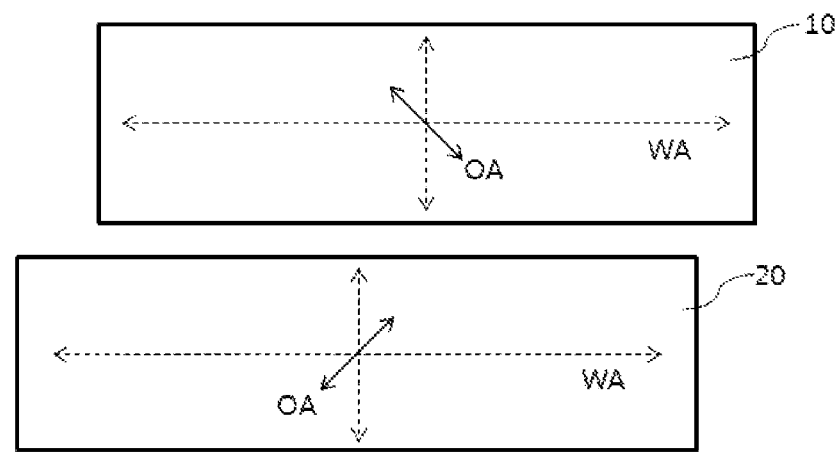

【FIG. 3】
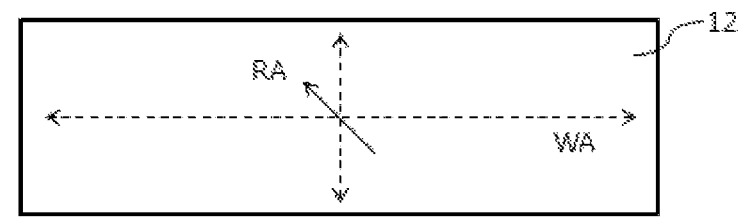
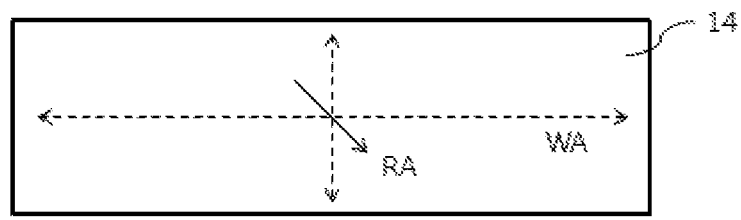
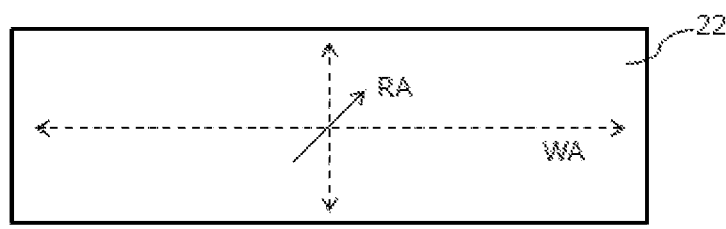
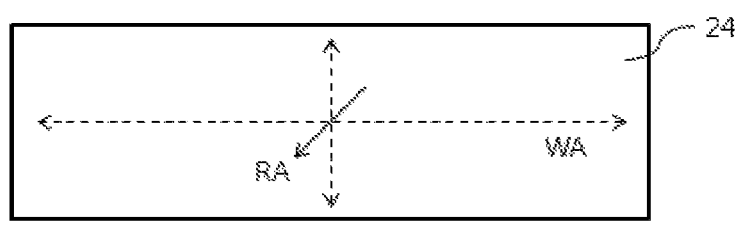

【FIG. 4】

| 11 |
|---|
| 12 |
| 13 |
| 14 |
| 15 |

【FIG. 5】

| 21 |
|---|
| 22 |
| 23 |
| 24 |
| 25 |

[FIG. 6]
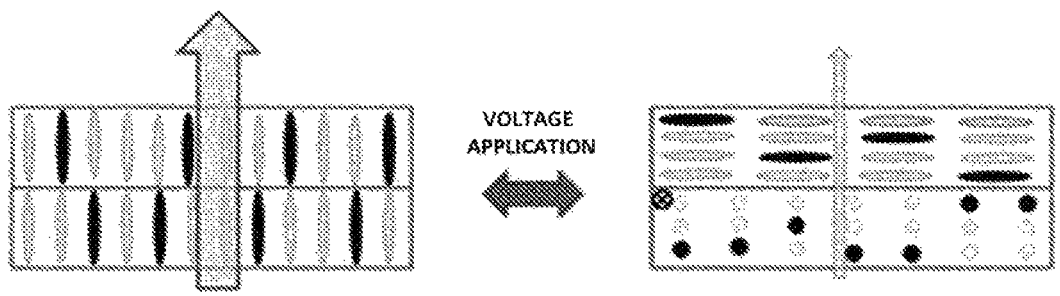
[FIG. 7]
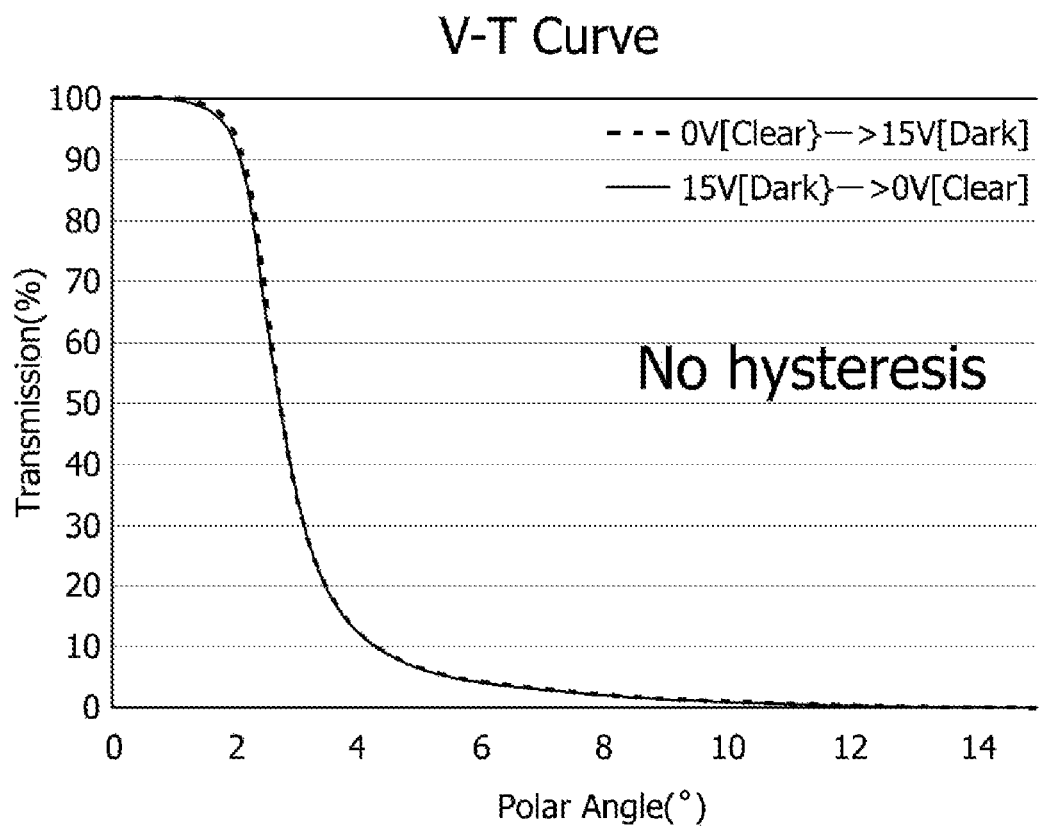

【FIG. 8】
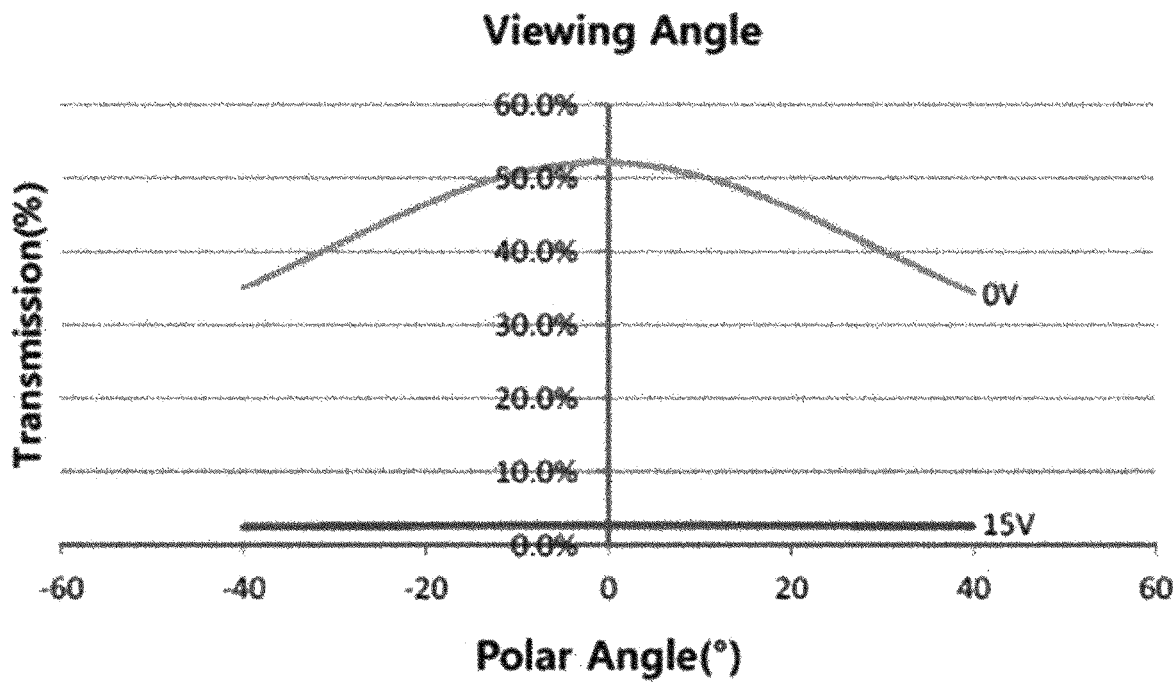
【FIG. 9】
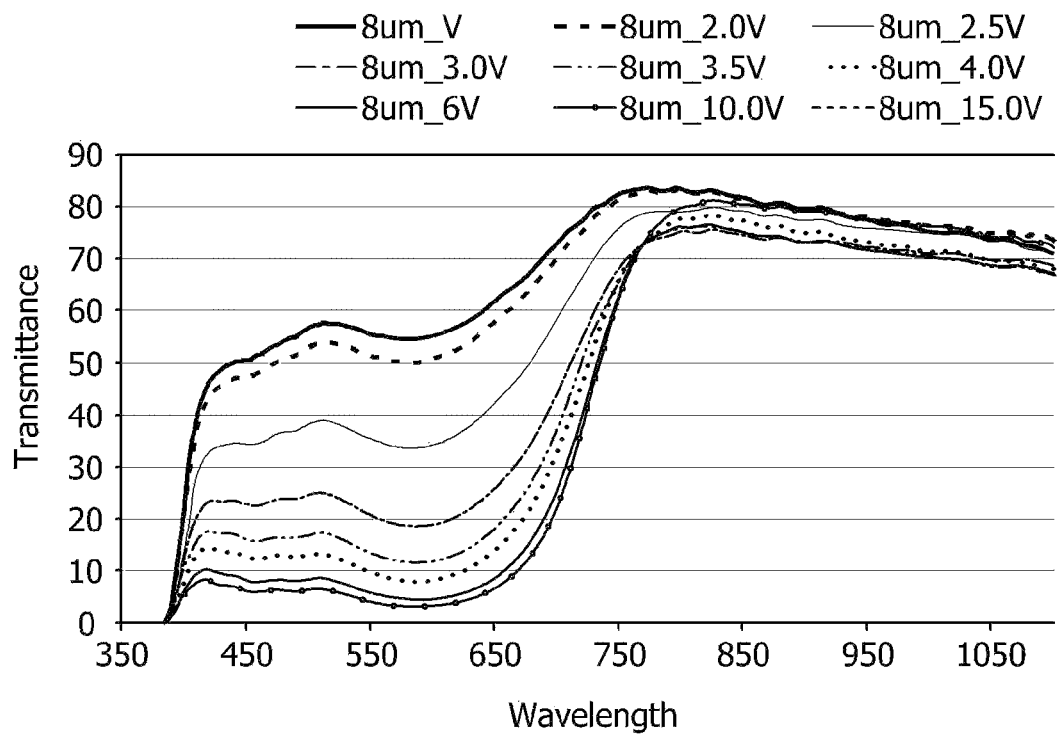

【FIG. 10】
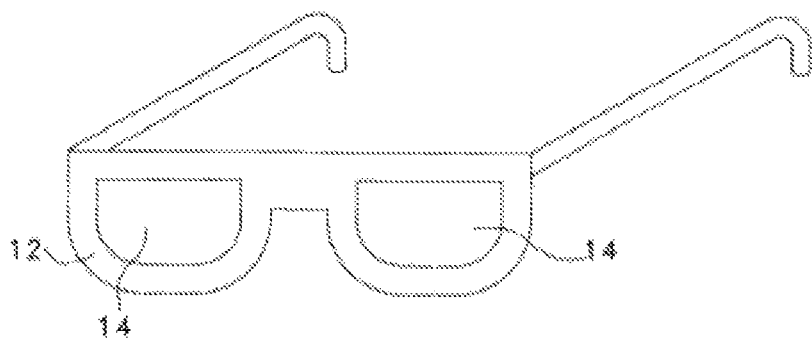
【FIG. 11】
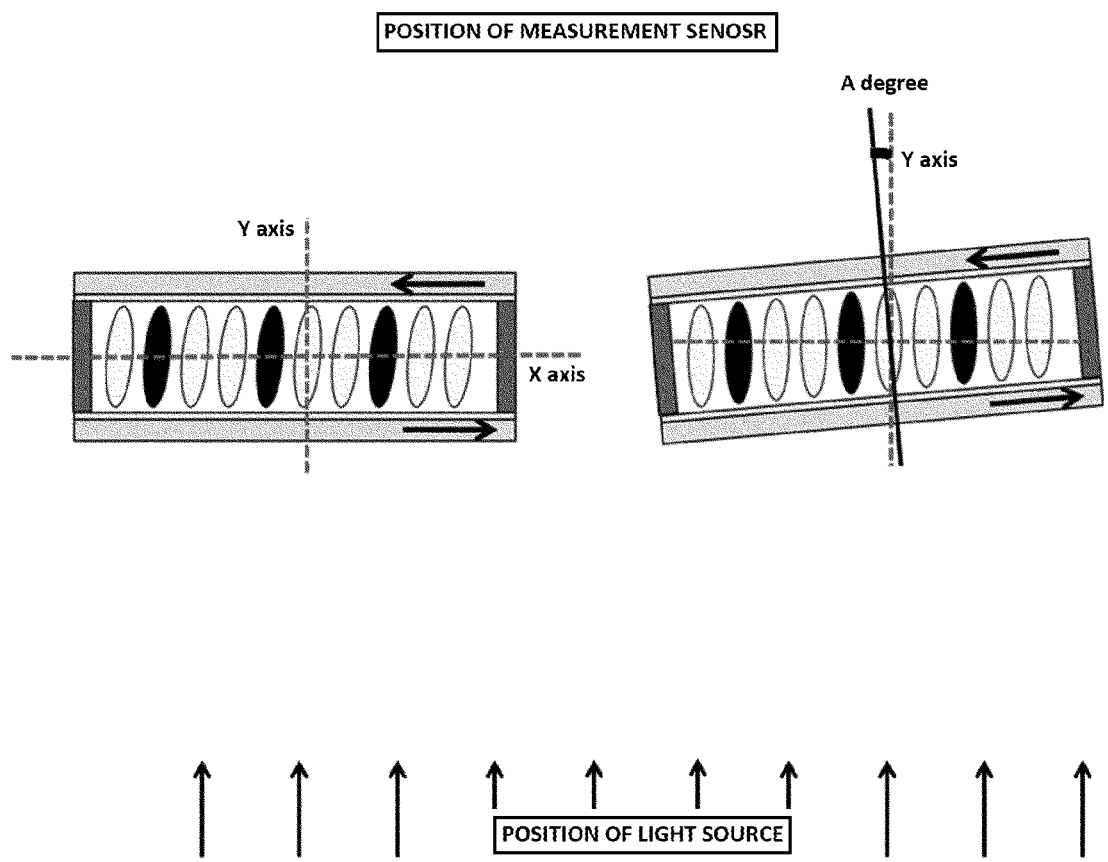

[FIG. 12]
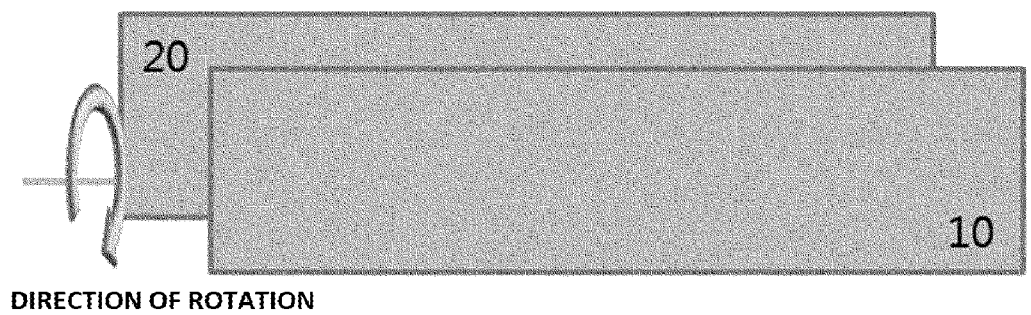
DIRECTION OF ROTATION

TRANSMITTANCE-VARIABLE FILM

CROSS-REFERENCE TO RELATED APPLICATIONS

The present application is a national phase entry under 35 U.S.C. § 371 of International Application No. PCT/KR2017/004060, filed on Apr. 14, 2017 which claims priority from Korean Patent Application No. 10-2016-0045629 filed on Apr. 14, 2016, the disclosure of which is incorporated herein by reference.

TECHNICAL FIELD

The present application relates to a transmittance-variable film.

BACKGROUND ART

Transmittance-variable films using a so-called guest-host cell (a GH cell) to which a mixture of a host material and a dichroic dye guest is applied are known in the art. In this case, liquid crystal compounds are used as the host material.

Such transmittance-variable films have been applied to various applications including eyewear such as sunglasses or glasses, external walls of buildings, sunroofs for vehicles, etc. In recent years, the application of the transmittance-variable device to eyewear for experiencing augmented realities (AR) has been generally examined.

DISCLOSURE

Technical Problem

The present application is directed to providing a transmittance-variable film.

Technical Solution

One aspect of the present application provides a transmittance-variable film. In this specification, the term "transmittance-variable film" may refer to a film designed to switch between a relatively high transmissivity state (hereinafter referred to as a transmissive state or a clear state) and a relatively low transmissivity state (hereinafter referred to as a cut-off state or dark state).

According to one exemplary embodiment, the transmittance-variable film may have a transmissivity in the transmissive state of approximately 30% or more, approximately 35% or more, approximately 40% or more, approximately 45% or more, or approximately 50% or more. Also, the transmittance-variable film may have a transmissivity in the cut-off state of approximately 20% or less, approximately 15% or less, or approximately 10% or less.

Since the transmissivity in the transmissive state is more desirable when values are higher and the transmissivity in the cut-off state is more desirable when the values are lower, the upper and lower limits of each of the transmissivities in the transmissive and cut-off states are not particularly limited. According to one exemplary embodiment, the upper limit of the transmissivity in the transmissive state may be approximately 100%, approximately 95%, approximately 90%, approximately 85%, approximately 80%, approximately 75%, approximately 70%, approximately 65%, or approximately 60%. The lower limit of the transmissivity in the cut-off state may be approximately 0%, approximately 1%, approximately 2%, approximately 3%, approximately 4%, approximately 5%, approximately 6%, approximately 7%, approximately 8%, approximately 9%, or approximately 10%.

The transmissivity may be a transmissivity of linear light. The term "transmissivity of linear light" may refer to a ratio of light (linear light) passing through a transmittance-variable film in a predetermined direction to light incident on the transmittance-variable film in the same direction as the direction of incidence. According to one exemplary embodiment, the transmissivity may be a value (a transmissivity of normal line light) measured for light incident in a direction parallel with a normal line of a surface of the transmittance-variable film, or may be a value (a transmissivity of oblique light) measured for light incident in a direction formed at an angle of greater than 0° and less than 20° with respect to the surface normal line. According to another exemplary embodiment, an angle formed between a direction of incident light and the surface normal line to measure the transmissivity of oblique light may be greater than or equal to approximately 0.5°, approximately 1°, or approximately 1.5°, or may be less than or equal to approximately 19.5°, approximately 19°, approximately 18.5°, approximately 18°, approximately 17.5°, approximately 17°, approximately 16.5°, approximately 16°, approximately 15.5°, approximately 15°, approximately 14.5°, approximately 14°, approximately 13.5°, approximately 13°, approximately 12.5°, approximately 12°, approximately 11.5°, approximately 11°, approximately 10.5°, approximately 10°, approximately 9.5°, approximately 9°, approximately 8.5°, approximately 8°, approximately 7.5°, approximately 7°, approximately 6.5°, approximately 6°, approximately 5.5°, approximately 5°, approximately 4.5°, approximately 4°, approximately 3.5°, or approximately 3°.

According to one exemplary embodiment, in the transmissivity in the transmissive state of the transmittance-variable film, the transmissivity of oblique light may be higher than the transmissivity of normal line light. As described below, such a state may be adjusted by controlling a pretilt angle, etc. As such, the transmittance-variable film having a higher transmissivity of oblique light than the transmissivity of normal line light may be particularly properly applied to eyewear.

In a structure including at least two guest-host liquid crystal layers (hereinafter referred to as GHLC layers), it is possible to switch between the transmissive and cut-off states by adjusting the alignment of a dichroic dye in each of the GHLC layers.

The exemplary transmittance-variable film of the present application may include a first liquid crystal cell and a second liquid crystal cell. The first liquid crystal cell may include a first GHLC layer. The second liquid crystal cell may include a second GHLC layer.

The first and second liquid crystal cells may be included to overlap each other. Accordingly, light passing through the first liquid crystal cell may be incident on the second liquid crystal cell. On the other hand, light passing through the second liquid crystal cell may also be incident on the first liquid crystal cell.

FIG. 1 is a diagram schematically showing states of a first liquid crystal cell 10 and a second liquid crystal cell 20 which overlap each other as described above.

Such a structure may be referred to as a double cell structure in this specification.

Each of the first and second liquid crystal cells may switch between vertically aligned and horizontally aligned states. According to one exemplary embodiment, the switching between the vertically aligned and horizontally aligned states may be carried out, depending on the application of a voltage to the liquid crystal cells. For example, a liquid crystal cell that is in a vertically aligned state when no voltage is applied may switch into a horizontally aligned state by application of a voltage to the liquid crystal cell. On the other hand, a liquid crystal cell that is in a horizontally aligned state may switch into a vertically aligned state by application of a voltage to the liquid crystal cell.

In this specification, the vertically aligned state may refer to a state in which directors of liquid crystal molecules are arranged perpendicularly to a plane of a liquid crystal layer, for example, an arrangement state forming an angle of approximately 85° to 95° or approximately 90° with respect to the plane of the liquid crystal layer.

In this specification, the horizontally aligned state may refer to a state in which directors of liquid crystal molecules are arranged parallel with the plane of the liquid crystal layer, for example, an arrangement state forming an angle of −5° to 5° or approximately 0° with respect to the plane of the liquid crystal layer.

In this specification, each of the directors of the liquid crystal molecules may refer to the optical axis or slow axis of the liquid crystal layer. Each of the directors of the liquid crystal molecules may refer to the axis in a major-axis direction when the liquid crystal molecules are in a rod shape, and refer to the axis in a normal line direction of a discotic plane when the liquid crystal molecules are in a discotic shape.

The optical axes of the first liquid crystal cell and the second liquid crystal cell in the horizontally aligned state may be formed at an angle of approximately 85° to 95°, or may be perpendicular to each other. According to one exemplary embodiment, one of the first and second liquid crystal cells 10 and 20 in the horizontally aligned state, for example, the first liquid crystal cell 10 may have an optical axis OA ranging from 40° to 50° in a clockwise direction with respect to the width axis WA of the liquid crystal cell, and the other liquid crystal cell, for example, the second liquid crystal cell 20 may have an optical axis OA ranging from 130° to 140° in a clockwise direction with respect to the width axis WA of the liquid crystal cell, as shown in FIG. 2. The transmittance-variable film having excellent bilateral symmetry may be provided because a difference in contrast ratio between left and right viewing angles is reduced through such a relationship between the optical axes of the first liquid crystal cell and the second liquid crystal cell.

The optical axes of the aforementioned liquid crystal cells may be generally determined in an alignment direction of an alignment film as will be described below. In this case, the optical axes of the liquid crystal cells may be measured, as follows. First, the optical axis of the first or second liquid crystal cell may be determined by disposing an absorptive linear polarizer on one surface of the liquid crystal cell in a state in which the liquid crystal cell is horizontally aligned, and measuring transmissivity while rotating the polarizer 360°. That is, a direction of the optical axis may be determined by measuring brightness (transmissivity) at one side of the liquid crystal cell or the absorptive linear polarizer while irradiating the other side of the liquid crystal cell or the absorptive linear polarizer with light in such a state. For example, when the transmissivity is minimal in a process of rotating the polarizer 360°, an angle formed perpendicularly to the absorption axis of the polarizer or an angle formed parallel with the absorption axis of the polarizer may be defined as a direction of the optical axis.

In this specification, the width axis WA of the liquid crystal cell may refer to a direction parallel with a major-axis direction of the liquid crystal cell, or a direction parallel with a line connecting both eyes of an observer who wears eyewear or an observer who observes a display device such as a TV when the liquid crystal cell is applied to the eyewear or the display device.

Each of the first GHLC layer and the second GHLC layer may include liquid crystals and an anisotropic dye. Hereinafter, the liquid crystals and the anisotropic dye may be applied in common as liquid crystals and an anisotropic dye of the first GHLC layer and the second GHLC layer unless particularly defined otherwise in describing the liquid crystals and the anisotropic dye.

In this specification, the term "GHLC layer" may refer to a functional layer in which an anisotropic dye is arranged with the arrangement of liquid crystals to exhibit anisotropic light absorption characteristics with respect to each of an alignment direction of the anisotropic dye and a direction perpendicular to the alignment direction. For example, the anisotropic dye is a material in which the absorbance of light varies according to a polarization direction, and thus may be referred to as a p-type dye when the dye has a high absorbance of light polarized in a major-axis direction and referred to as an n-type dye when the dye has a high absorbance of light polarized in a minor-axis direction. According to one exemplary embodiment, when the p-type dye is used, polarized light oscillating in a major-axis direction of the dye may be absorbed, and polarized light oscillating in a minor-axis direction of the dye may be transmitted because the polarized light is poorly absorbed. Unless particularly defined otherwise, is assumed that the anisotropic dye is a p-type dye.

The liquid crystal cell including the GHLC layer may serve as an active polarizer. In this specification, the term "active polarizer" may refer to a functional device that may adjust anisotropic light absorption according to the application of an external action. For example, the GHLC layer may adjust an alignment of the liquid crystals and the anisotropic dye to adjust anisotropic light absorption with respect to polarized light in a direction parallel with an alignment direction of the anisotropic dye and polarized light in a vertical direction. Since the alignment of the liquid crystals and the anisotropic dye may be adjusted by applying an external action such as a magnetic field or an electric field, the GHLC layer may adjust the anisotropic light absorption, depending on the application of the external action.

A thickness of each of the first GHLC layer and the second GHLC layer may be properly chosen in consideration of the objects of the present application. According to one exemplary embodiment, the thickness of the first or second GHLC layer or the liquid crystal cell including the layer may be greater than or equal to approximately 0.01 µm, 0.05 µm, 0.1 µm, 0.5 µm, 1 µm, 1.5 µm, 2 µm, 2.5 µm, 3 µm, 3.5 µm, 4 µm, 4.5 µm, 5 µm, 5.5 µm, 6 µm, 6.5 µm, 7 µm, 7.5 µm, 8 µm, 8.5 µm, 9 µm, or 9.5 µm. When the thickness is controlled as described above, a film which has a high difference between the transmissivity in the transmissive state and the transmissivity in the cut-off state, that is, a film having a high contrast ratio may be realized. The high contrast ratio may be realized as the thickness increases, but the present is not particularly limited thereto. In general, the thickness of the first or second GHLC layer may be less than or equal to approximately 30 µm, 25 µm, 20 µm, or 15 µm.

Liquid crystals whose arrangement state is switchable upon application of a voltage may be properly selected and used as the liquid crystals included in each of the first GHLC layer and the second GHLC layer. For example, nematic liquid crystals may be used as the liquid crystals. In this specification, the nematic liquid crystals may refer to liquid crystals that are aligned parallel to a major-axis direction of rod-shaped liquid crystal molecules even when the liquid crystal molecules have no regularity with respect to positions thereof.

Each of the first GHLC layer and the second GHLC layer may have liquid crystals having a negative dielectric anisotropy. An absolute value of the dielectric anisotropy of the liquid crystals may be properly chosen in a consideration of the objects of the present application. In this specification, the term "dielectric anisotropy ($\Delta\varepsilon$)" may refer to a difference between a horizontal dielectric constant ($\varepsilon//$) and a vertical dielectric constant ($\varepsilon\perp$) of the liquid crystals. In this specification, the term "horizontal dielectric constant ($\varepsilon//$)" refers to a dielectric constant value measured in a direction of the electric field in a state in which a voltage is applied so that a direction of the electric field formed by an applied voltage is substantially parallel with that of the directors of the liquid crystal molecules, and the term "vertical dielectric constant ($\varepsilon\perp$)" refers to a dielectric constant value measured in a direction of the electric field in which a voltage is applied so that a direction of the electric field formed by an applied voltage is substantially perpendicular to the directors of the liquid crystal molecules.

In this specification, the term "dye" may refer to a material that may intensively absorb and/or transform light in some or all of a visible light region, for example, a wavelength range of 400 nm to 700 nm, and the term "anisotropic dye" may refer to a material that may allow anisotropic absorption of light in some or all of the visible light region.

Dyes known to have a property of being aligned according to an alignment state of liquid crystals may, for example, be selected and used as the anisotropic dye. For example, a black dye may be used as the anisotropic dye. Such a dye may, for example, include an azo dye or an anthraquinone dye known in the related art, but the present application is not limited thereto.

The dichroic ratio of the anisotropic dye may be properly selected in consideration of the objects of the present application. For example, the anisotropic dye may have a dichroic ratio of 5 or more to 20 or less. In this specification, the term "dichroic ratio" may refer to a value obtained by dividing the absorption of polarized light parallel with a major-axis direction of the anisotropic dye by the absorption of polarized light parallel with a direction perpendicular to the major-axis direction, for example, when the dye is a p-type dye. The anisotropic dye may have the dichroic ratio in a wavelength range of a visible light region, for example, at least some wavelengths or one wavelength in a wavelength range of approximately 380 nm to 700 nm or approximately 400 nm to 700 nm.

A content of the anisotropic dye in each of the first GHLC layer and the second GHLC layer may be properly chosen in consideration of the objects of the present application. For example, a content of the anisotropic dye in each of the first GHLC layer and the second GHLC layer may be in a range of 0.1% by weight to 10% by weight. The ratio of the anisotropic dye may be varied in consideration of desired transmissivity, etc.

The first and/or second GHLC layer or the first and/or second liquid crystal cell including the first and/or second GHLC layer may have a degree of anisotropy R of approximately 0.5 or more separately or at the same time.

The degree of anisotropy R is measured from the absorbance (E(p)) of a beam polarized parallel with an alignment direction of a liquid crystal host and the absorbance (E(s)) of a beam polarized perpendicularly to the alignment direction of the liquid crystal host according to the following equation.

<Measurement of Degree of Anisotropy>

Degree of anisotropy $R=[E(p)-E(s)]/[E(p)+2*E(s)]$

The criteria used above are applied to the other identical devices having no dye in the GHLC layers.

Specifically, the degree of anisotropy R may be measured from a value (E(p)) for the absorbance of the liquid crystal cell in which dye molecules are horizontally aligned and a value (E(s)) for the absorbance of the same liquid crystal cell in which the dye molecules are vertically aligned. The absorbance is measured in comparison of the liquid crystal cell including no dye at all but having another identical configuration. Such measurement may be carried out using polarized beams which oscillate (E(p)) in a direction parallel with an alignment direction when there is one plane of oscillation and oscillate (E(s)) in a direction perpendicular to the alignment direction upon subsequent measurements. The liquid crystal cell does not switch or rotate during the measurement, and thus the measurements of E(p) and E(s) may be carried out by rotating a plane of oscillation of polarized incident light.

One exemplary embodiment of detailed procedures is as described below. The spectra for the measurement of E(p) and E(s) are recorded using a Perkin Elmer Lambda 1050 UV spectrometer. The spectrometer is provided with a Glan-Thompson polarizer for both measuring beams and reference beams in a wavelength range of 250 nm to 2500 nm. Two polarizers are controlled by a stepping motor, and disposed in the same direction. A change in the polarizer direction of the polarizer, for example, a change of 0° to 90° is always synchronously carried out in the same direction with respect to the measuring beams and the reference beams. The alignment of individual polarizers may be measured using a method disclosed in a doctoral thesis by T. Karstens of the University of Wurzburg in 1973.

In this method, polarizers rotate stepwise by 5° with respect to an aligned dichroic sample, and the absorbance is preferably recorded at a fixed wavelength in a maximum absorption region. A new zero line is executed with respect to a position of each of the polarizers. To measure two dichroic spectra E(p) and E(s), an antiparallel-rubbed test cell coated with polyimide AL-1054 from JSR is disposed in both measuring beams and reference beams. Two test cells may be selected with the same layer thickness. A test cell containing a pure host (liquid crystals) is disposed in the reference beams. A test cell containing a solution of a dye in the liquid crystals is disposed in the measuring beams. For the measuring beams and reference beams, the two test cells are installed inside a ray path in the same alignment direction. To ensure the maximum possible degree of accuracy of the spectrometer, E(p) may be essentially in a maximum absorption wavelength range thereof, for example, a wavelength range of 0.5 to 1.5. This corresponds to a transmittance of 30% to 5%. This is achieved by adjusting the layer thickness and/or dye concentration accordingly.

The degree of anisotropy R may be calculated from the values measured for the E(p) and E(s) according to the equation as described in the reference [see: "Polarized Light in Optics and Spectroscopy", D. S. Kliger et al., Academic Press, 1990].

According to another exemplary embodiment, the degree of anisotropy R may be greater than or equal to approximately 0.55, 0.6, or 0.65. For example, the degree of anisotropy R may be less than or equal to approximately 0.9, approximately 0.85, approximately 0.8, approximately 0.75, or approximately 0.7.

Such a degree of anisotropy R may be obtained by controlling the type of liquid crystal cell, for example, the type of liquid crystal compound (a host), the type and ratio of the anisotropic dye, the thickness of the liquid crystal cell, etc.

While using lower energy due to the degree of anisotropy R within this range, it is possible to provide a film in which the contrast ratio is improved as a difference in transmissivity between the transmissive state and cut-off state increases.

Each of the first liquid crystal cell and the second liquid crystal cell may further include two sheets of alignment films disposed at both sides of the first GHLC layer and the second GHLC layer. According to one exemplary embodiment, the first liquid crystal cell may sequentially include a first vertical alignment film, a first GHLC layer, and a second vertical alignment film, and the second liquid crystal cell may sequentially include a third vertical alignment film, a second GHLC layer, and a fourth vertical alignment film.

The transmittance of the transmittance-variable film according to the present application may be adjusted by adjusting an alignment direction of the first GHLC layer and the second GHLC layer when a voltage is not applied and/or when a voltage is applied. The alignment direction may be adjusted by adjusting pretilt angles and pretilt directions of the first to fourth vertical alignment films.

In this specification, a pretilt may have a pretilt angle and a pretilt direction. The pretilt angle may be referred to as a polar angle, and the pretilt direction may be referred to as an azimuthal angle.

The pretilt angle may refer to an angle at which directors of liquid crystal molecules are formed with respect to a plane parallel with the alignment film, or an angle at which the directors of the liquid crystal molecules are formed with respect to a normal line direction of a surface of the liquid crystal cell. The pretilt angle of the vertical alignment film may guide a vertically aligned state when a voltage is not applied to the liquid crystal cell.

According to one exemplary embodiment, the first to fourth vertical alignment films may have a pretilt angle ranging from 70° to 89°. When the pretilt angle falls within this range, a transmittance-variable film having excellent initial transmittance may be provided. According to one exemplary embodiment, the pretilt angle may be greater than or equal to approximately 71°, approximately 72°, approximately 73°, or approximately 74°, or may be less than or equal to approximately 88.5° or approximately 88°.

According to one exemplary embodiment, the pretilt angle of the first vertical alignment film may be an angle measured in a clockwise direction or a counterclockwise direction with respect to a plane parallel with the alignment film, and the pretilt angle of the second vertical alignment film may be an angle measured in a direction opposite to that of the first vertical alignment film, that is, an angle measured in a counterclockwise direction when the pretilt angle of the first vertical alignment film is measured in a clockwise direction, or an angle measured in a clockwise direction when the pretilt angle of the first vertical alignment film is measured in a counterclockwise direction.

Also, the pretilt angle of the third vertical alignment film may be an angle measured in a clockwise direction or a counterclockwise direction with respect to a plane parallel with the alignment film, and the pretilt angle of the fourth vertical alignment film may be an angle measured in a direction opposite to that of the third vertical alignment film, that is, an angle measured in a counterclockwise direction when the pretilt angle of the third vertical alignment film is measured in a clockwise direction, or an angle measured in a clockwise direction when the pretilt angle of the third vertical alignment film is measured in counterclockwise direction.

The pretilt direction may refer to a direction in which directors of liquid crystal molecules are projected to a plane parallel with the alignment film. According to one exemplary embodiment, the pretilt direction may be an angle formed between the projecting direction and the width axis WA. The pretilt direction of the vertical alignment film may guide an alignment direction of a horizontally aligned state when a voltage is applied to the liquid crystal cell.

The pretilt direction of the first and second vertical alignment films and the pretilt direction of the third and fourth vertical alignment films may intersect with each other. According to one exemplary embodiment, the pretilt direction of the first and second vertical alignment films and the pretilt direction of the third and fourth vertical alignment films may be perpendicular to each other, for example, formed at an angle of 85° to 95° or approximately 90°. When the pretilt direction satisfies the requirements, a transmittance-variable film having an excellent shielding rate upon application of a voltage may be provided.

Also, according to one exemplary embodiment, one of the pretilt direction of the first and second vertical alignment films and the pretilt direction of the third and fourth vertical alignment films, for example, the pretilt direction of the first and second vertical alignment films may have an optical axis OA in a range of 40° to 50° in a clockwise direction with respect to the width axis WA of the liquid crystal cell, and the other pretilt direction, for example, the pretilt direction of the third and fourth vertical alignment films may have an optical axis OA in a range of 130° to 140° in a clockwise direction with respect to the width axis WA of the liquid crystal cell. A transmittance-variable film having excellent bilateral symmetry may be provided because a difference in contrast ratio between left and right viewing angles is reduced through such a relationship.

According to one exemplary embodiment, the aforementioned pretilt angle and direction may be a pretilt angle and direction measured for each of the GHLC layers when the GHLC layer of each of the liquid crystal cells is in a vertically aligned state.

The first to fourth vertical alignment films may be rubbing alignment films or optical alignment films. The alignment direction is determined by a rubbing direction in the case of the rubbing alignment films, and is determined by a polarization direction of irradiated light and the like in the case of the optical alignment films. The pretilt angles and pretilt directions of the vertical alignment films may be realized by properly adjusting an alignment condition, for example, a rubbing condition or a pressure condition upon rubbing alignment, or an optical alignment condition, for example, a polarized state of light, a light irradiation angle, a light irradiation intensity, etc.

For example, when the vertical alignment film is a rubbing alignment film, the pretilt angle may be achieved by controlling the rubbing intensity of the rubbing alignment film, etc., and the pretilt direction may be achieved by controlling the rubbing direction of the rubbing alignment film. Such a method used to achieve this is a known method. Also, when the vertical alignment film is an optical alignment film, the pretilt angle may be achieved by a material for alignment films, a direction, state and intensity of polarized light applied to alignment, etc.

According to one exemplary embodiment, each of the first to fourth vertical alignment films may be a rubbing alignment film. Each of the first to fourth vertical alignment films may have a unique alignment direction.

For example, the rubbing directions of the first and second vertical alignment films are opposite to each other, and thus may form an angle of approximately 170° to 190°. Also, the rubbing directions of the third and fourth vertical alignment films are opposite to each other, and thus may form an angle of approximately 170° to 190°.

The rubbing direction may be determined by measuring the pretilt angle. In general, since a pretilt angle is formed as liquid crystals lie flat in a rubbing direction, the rubbing direction may be measured by measuring the pretilt angle in a manner as described in the following examples.

According to one exemplary embodiment, a rubbing (alignment) direction RA of the first vertical alignment film 12 may be in a range of 40° to 50°, a rubbing (alignment) direction RA of the second vertical alignment film 14 may be in a range of 220° to 230°, a rubbing (alignment) direction RA of the third vertical alignment film 22 may be in a range of 130° to 140°, and a rubbing (alignment) direction RA of the fourth vertical alignment film 24 may be in a range of 310° to 320°, as shown in FIG. 3. A transmittance-variable film in which the switching between the vertically aligned state and the horizontally aligned state may be effectively achieved through such a relationship between the rubbing alignment directions of the first to fourth vertical alignment films may be provided. Each of the rubbing (alignment) directions RA is an angle measured in a clockwise direction or counterclockwise direction with respect to the width axis WA. However, only one direction for measuring each of the rubbing (alignment) directions RA is selected from the clockwise or counterclockwise direction, and then measured.

According to one exemplary embodiment, as shown in FIG. 3, both an angle formed between the rubbing (alignment) direction RA and the width axis WA of the first vertical alignment film 12 and an angle formed between the rubbing direction RA and the width axis WA of the second vertical alignment film 14 may be in a range of 40° to 50° when measured in a clockwise direction with respect to the width axis WA. In this case, the rubbing (alignment) direction RA of the first vertical alignment film 12 and the rubbing direction RA of the second vertical alignment film 14 may be opposite to each other.

Also, as shown in FIG. 3, both an angle formed between the rubbing (alignment) direction RA and the width axis WA of the third vertical alignment film 22 and an angle formed between the rubbing direction RA and the width axis WA of the fourth vertical alignment film 24 may be in a range of 130° to 140° when measured in a clockwise direction with respect to the width axis WA. In this case, the rubbing (alignment) direction RA of the third vertical alignment film 22 and the rubbing direction RA of the fourth vertical alignment film 24 may be opposite to each other.

Even when optical alignment films are used as the first to fourth vertical alignment films, conditions may be controlled to achieve the aforementioned pretilt angle and direction.

The exemplary transmittance-variable film may further include electrode films disposed outside the first to fourth vertical alignment films. In this specification, the outside of any configuration may refer to a side opposite to a side on which a liquid crystal layer is present. The electrode films disposed outside the first to fourth vertical alignment films may be referred to as the first to fourth electrode films, respectively.

FIG. 4 is a diagram schematically showing a first liquid crystal cell including a GHLC layer, an electrode film, and a vertical alignment film. As shown in FIG. 4, the first liquid crystal cell 10 may sequentially include a first electrode film 11, a first vertical alignment film 12, a first GHLC layer 13, a second vertical alignment film 14, and a second electrode film 15. The thicknesses of the first and second electrode films and the first and second vertical alignment films may be properly chosen in consideration of the objects of the present application.

FIG. 5 is a diagram schematically showing a second liquid crystal cell including a GHLC layer, an electrode film, and a vertical alignment film. As shown in FIG. 5, the second liquid crystal cell 20 may sequentially include a third electrode film 21, a third vertical alignment film 22, a second GHLC layer 23, a fourth vertical alignment film 24, and a fourth electrode film 25. The thicknesses of the third and fourth electrode films and the third and fourth vertical alignment films may be properly chosen in consideration of the objects of the present application.

Each of the electrode films may include a base film and a transparent conductive layer formed on the base film. The electrode films may apply a proper electric field to the first liquid crystal cell and the second liquid crystal cell to switch an alignment state of liquid crystals and an anisotropic dye. A direction of the electric field may be a vertical direction, for example, a thickness direction of the first liquid crystal cell and the second liquid crystal cell.

A plastic film, and the like may be used as the base film. Examples of the plastic film may include films including triacetyl cellulose (TAC); a cyclo olefin copolymer (COP) such as norbornene derivatives; poly(methyl methacrylate) (PMMA); polycarbonate (PC); polyethylene (PE); polypropylene (PP); polyvinyl alcohol (PVA); diacetyl cellulose (DAC); polyacrylate (Pac); polyether sulfone (PES); polyetheretherketone (PEEK); polyphenylsulfone (PPS), polyetherimide (PEI); polyethylenenaphthatlate (PEN); polyethyleneterephthalate (PET); polyimide (PI); polysulfone (PSF), or polyarylate (PAR).

According to one exemplary embodiment, the first and/or fourth electrode film may include an optically isotropic base film or an optically anisotropic base film. According to one exemplary embodiment, the second and/or third electrode film may include an optically isotropic base film, for example, a polycarbonate (PC) film, a cyclo olefin copolymer (COP) film, or a polyimide (PI) film.

As the transparent conductive layer, for example, a conductive layer formed by depositing a conductive polymer, a conductive metal, conductive nanowires, or a metal oxide such as indium tin oxide (ITO) may be used. In addition, various materials capable of forming the transparent conductive layer, and methods of forming the transparent conductive layer are known in the related art, and may be applied without limitation.

The transmittance-variable film according to the present application may further include a pressure-sensitive adhesive. The first liquid crystal cell and the second liquid crystal cell may be present in a state of being adhered to each other by means of the pressure-sensitive adhesive. Pressure-sensitive adhesive layers used to attach an optical film may be properly chosen and used as the pressure-sensitive adhesive. The thickness of the pressure-sensitive adhesive may be properly chosen in consideration of the objects of the present application.

The transmittance-variable film of the present application may further include a hard coating film. The hard coating film may include a base film and a hard coating layer formed on the base film. Known hard coating films may be properly chosen and used as the hard coating film in consideration of the objects of the present application. The thickness of the hard coating film may be properly chosen in consideration of the objects of the present application.

The hard coating film may be formed outside the first liquid crystal cell and/or the second liquid crystal cell by means of the pressure-sensitive adhesive. For example, the hard coating film may be attached to the outside of the first electrode film and/or the fourth electrode film by means of the pressure-sensitive adhesive. Pressure-sensitive adhesives used to attach an optical film may be properly chosen and used as the pressure-sensitive adhesive.

The transmittance-variable film of the present application may further include an anti-reflective film. The anti-reflective film may include a base film and an anti-reflective layer formed on the base film. Known anti-reflective films may be properly chosen and used as the anti-reflective film in consideration of the objects of the present application. The thickness of the anti-reflective film may be properly chosen in consideration of the objects of the present application.

The anti-reflective film may be formed outside the first liquid crystal cell and/or the second liquid crystal cell by means of a pressure-sensitive adhesive. For example, the anti-reflective film may be attached to the first electrode film and/or the fourth electrode film by means of the pressure-sensitive adhesive. Pressure-sensitive adhesives used to attach an optical film may be properly chosen and used as the pressure-sensitive adhesive.

As described above, the transmittance of the transmittance-variable film according to the present application may be adjusted according to the application of a voltage by adjusting an alignment state when a voltage is not applied and/or a voltage is applied to the first liquid crystal cell and the second liquid crystal cell. The liquid crystals and the anisotropic dye may be aligned according to the alignment direction. Therefore, the alignment direction may be parallel with an optical axis direction of the liquid crystals and/or an absorption axis direction of the anisotropic dye.

According to one exemplary embodiment, the transmittance-variable film may realize a clear state when each of the first liquid crystal cell and the second liquid crystal cell is in a vertically aligned state, and may realize a dark state when each of the first liquid crystal cell and the second liquid crystal cell is in a horizontally aligned state. In this specification, the clear state may refer to a state in which the transmissivity is high, and the dark state may refer to a state in which the transmissivity is low.

According to one exemplary embodiment, the transmissivity in the clear state may be greater than or equal to 40%, 45%, or 50%, and the transmissivity in the dark state may be less than or equal to 5%, 4%, or 3%.

In this specification, the transmissivity may refer to a transmissivity of linear light with respect to vertical light. As such, the vertical light is light incident in a direction side by side with a normal line direction of a surface of the transmittance-variable film, and the linear light transmissivity of the vertical light is a percentage of light transmitted in a direction side by side with the normal line direction with respect to the vertical light incident on a surface of the transmittance-variable film.

FIG. 6 is a diagram schematically showing a principle of adjusting the transmittance of the transmittance-variable film according to the present application. The left panel of FIG. 6 shows a non-voltage-applied state, and the right panel shows a voltage-applied state. An area of a gray arrow refers to a quantity of transmitted light. In the left and right panels, an upper layer represents a first liquid crystal cell, a lower layer represents a second liquid crystal cell, blue ovals represent liquid crystals having a negative dielectric anisotropy, and black ovals represent an anisotropic dye.

As shown in FIG. 6, the transmittance-variable film of the present application may realize a clear state since each of the first liquid crystal cell and the second liquid crystal cell is present in a vertically aligned state and a quantity of transmitted light is relatively increased when a voltage is not applied. The transmittance-variable film may realize a clear state in which the transmissivity is greater than or equal to approximately 40% when a voltage is not applied. The transmittance-variable film of the present application has excellent initial transmittance when a voltage is not applied, compared to a case in which the transmittance-variable film has an initial transmittance of less than approximately 40% when a combination of a PVA-based polarizing plate and an active polarizer including a GHLC layer is applied to the transmittance-variable film.

As shown in FIG. 6, in the transmittance-variable film of the present application, each of the first liquid crystal cell and the second liquid crystal cell may be present in a horizontally aligned state when a voltage is applied. A uniaxial alignment direction of the first liquid crystal cell and a uniaxial alignment direction of the second liquid crystal cell may be orthogonal. In this case, since the absorption axes of the first liquid crystal cell and the second liquid crystal cell may be orthogonal, a quantity of transmitted light is relatively low due to a cross-pole effect, thereby realizing a dark state. The transmittance-variable film may realize a dark state in which the transmissivity is less than or equal to approximately 5% when a voltage is applied. The transmittance-variable film may switch into a clear state when a voltage is cut off.

As described above, the first liquid crystal cell in the horizontally aligned state may have an optical axis ranging from 40° to 50° in a clockwise direction with respect to the width axis of the liquid crystal cell, and the second liquid crystal cell may have an optical axis ranging from 130° to 140° in a clockwise direction with respect to the width axis of the liquid crystal cell. The transmittance-variable film having excellent bilateral symmetry may be provided because a difference in contrast ratio between left and right viewing angles is reduced through such a relationship between the optical axes of the first liquid crystal cell and the second liquid crystal cell.

The aforementioned transmittance-variable film may be applied to various applications. Examples of the applications to which the transmittance-variable film is applicable may include openings of closed spaces including buildings, vessels or vehicles, such as windows or sunroofs, or eyewear, etc. As such, all types of eyewear formed to allow an observer to see the outside through lenses, for example, general glasses, sunglasses, goggles and helmets for sports, or devices for experiencing augmented realities, may be included in a category of the eyewear.

A representative application to which the transmittance-variable film of the present application is applicable is the eyewear. In recent years, a type of eyewear provided with a lens so that the sunglasses, the goggles for sports, the devices for experiencing augmented realities, or the like are inclined with respect to the observer's front line of sight has been available on the market. The transmittance-variable film of the present application may also be effectively applied to the eyewear having the aforementioned configuration because a difference in contrast ratio between left and right tilt angles is reduced when observing in an inclined direction as described above, thereby ensuring excellent bilateral symmetry.

When the transmittance-variable film of the present application is applied to the eyewear, a structure of the eyewear is not particularly limited. That is, the transmittance-variable film may be applied to be installed in a lens for the left eye and/or the right eye having such a known eyewear structure.

For example, the eyewear may include a lens for the left eye, a lens for the right eye, and a frame configured to support the lenses for the left eye and the right eye.

FIG. 10 is a schematic diagram of eyewear. Here, the eyewear includes the frame 12 and the lenses 14 for the left eye and the right eye. However, the structure of the eyewear to which the transmittance-variable film of the present application is applicable is not limited to that as shown in FIG. 10.

In the eyewear, each of the lens for the left eye and the lens for the right eye may include the transmittance-variable film. Such lenses may include only the transmittance-variable film, or may also include other configurations.

The eyewear may have various designs. For example, the frame may be formed aslant so that an angle formed between a front view direction of an observer and a normal line of a surface of the transmittance-variable film is in a range of 15° to 40° when the observer is wearing the eyewear. Examples of such eyewear may include goggles for sports, devices for experiencing augmented realities, etc. When the transmittance-variable film formed aslant to the eyewear, the contrast ratio at the tilt angles of the first to fourth vertical alignment films may also be improved by adjusting the pretilt angles of the first to fourth vertical alignment films.

Advantageous Effects

The transmittance-variable film of the present application can be useful in switching between a clear state and a dark state and reducing a difference in contrast ratio between left and right viewing angles, thereby securing excellent bilateral symmetry. Such a transmittance-variable film can be applied to various applications including various materials for buildings or vehicles requiring the control of transmissivity, or eyewear such as goggles for sports or experiencing augmented realities, sunglasses, helmets, etc.

DESCRIPTION OF DRAWINGS

FIG. 1 is a diagram schematically showing a transmittance-variable film according to the present application;

FIG. 2 is a diagram showing the optical axes of first and second liquid crystal cells in a horizontally aligned state;

FIG. 3 is a diagram showing pretilt directions of first to fourth vertical alignment films;

FIG. 4 is a diagram schematically showing a first liquid crystal cell;

FIG. 5 is a diagram schematically showing a second liquid crystal cell;

FIG. 6 is a diagram showing a principle of adjusting the transmittance of the transmittance-variable film according to the present application;

FIG. 7 is a voltage-transmissivity graph plotted for Example 1;

FIG. 8 is a viewing angle-transmissivity graph plotted for Example 1;

FIG. 9 is a wavelength-transmissivity graph plotted according to a voltage for Example 4;

FIG. 10 is a diagram schematically showing eyewear; and

FIGS. 11 and 12 show embodiments of methods of measuring a pretilt angle.

BRIEF DESCRIPTION OF PARTS IN THE DRAWINGS

10: first liquid crystal cell,
20: second liquid crystal cell
11: first electrode film
12: first vertical alignment film
13: first GHLC layer
14: second vertical alignment film
15: second electrode film
21: third electrode film
22: third vertical alignment film
23: second GHLC layer
24: fourth vertical alignment film
25: fourth electrode film
14: lens for the left or right eye
12: frame

DETAILED DESCRIPTION OF EXEMPLARY EMBODIMENTS

Hereinafter, the present application will be described in detail with examples and comparative examples disclosed below. However, the present application is not limited to the examples disclosed below.

Method of Measuring a Pretilt Angle

A pretilt angle of a liquid crystal cell may be measured, as follows. A pretilt angle of the liquid crystal cell is measured using a method of measuring a pretilt angle of a single liquid crystal cell and a method of measuring a pretilt angle of a double cell in which two liquid crystal cells overlap each other. Here, each of the methods will be described. As such, it is desirable that all the first to fourth vertical alignment films have similar pretilt angles in the case of the method of measuring a pretilt angle of a double cell. Meanwhile, a pretilt direction may be determined by disposing an absorptive linear polarizer on one surface of the liquid crystal cell in a state in which each of the liquid crystal cells are horizontally aligned, and measuring transmissivity while rotating the polarizer 360°. For example, when the transmissivity is minimal in a process of rotating the polarizer 360°, an angle formed perpendicularly to the absorption axis of the polarizer or an angle formed parallel with the absorption axis of the polarizer may be defined as the pretilt direction.

1. Measurement of Pretilt Angle of Single Liquid Crystal Cell

First of all, as shown in FIG. 11, a liquid crystal cell is disposed between a light source and a transmissivity measurement sensor (for example, LCMS-200). In this configuration, a direction connecting the measurement sensor and the light source with the shortest distance therebetween is defined as the Y axis, and a direction perpendicular to the Y axis is defined as the X axis, as shown by the dotted lines in the drawing. Thereafter, as shown in FIG. 11, the transmissivity is evaluated using a measurement sensor by irradiating the liquid crystal cell with light of a light source while rotating the liquid crystal cell. In this procedure, an aligned state of the liquid crystal cell may be maintained in a vertically aligned state. The pretilt angle is measured from the angle formed between a normal line (indicated by a solid line in the drawing) of a surface of the liquid crystal cell and the Y axis at a point at which the transmissivity is maximal when the transmissivity is measured through the aforementioned process. For example, when the Y axis and the surface normal line form an angle of A degrees as shown in FIG. 11, the highest transmissivity is realized. In this case, the pretilt angle may be defined as a value obtained by subtracting A degrees from 90°. As such, the A is a positive number measured in a clockwise or counterclockwise direction.

2. Measurement of Pretilt Angle of Double Cell

In the case of a double cell, the pretilt angle may be measured in the same manner as described above. First of all, as shown in FIG. 12, a double cell is disposed between a light source and a transmissivity measurement sensor (for example, LCMS-200). That is, a light source is disposed at one side of the front (an exit direction in the drawing) and the rear (an enter direction in the drawing) of the first liquid crystal cell 10, and a measurement sensor is disposed at the other side, as shown in FIG. 12. Thereafter, an angle (the A degrees) formed between the Y axis (the axis of a direction connecting a light source and a measurement sensor at the shortest distance) and a normal line of a surface of the double cells is measured while rotating the double cell in a direction of rotation shown in the drawing at a point at which the transmissivity is maximal. Then, a value obtained by subtracting an absolute value of the angle from 90° may be defined as the pretilt angle. In this case, the alignment of the liquid crystal cells 10 and 20 may be maintained in a vertically aligned state.

Example 1

A film in which an indium tin oxide (ITO) layer was formed on one surface of a polycarbonate (PC) film having a width of approximately 300 mm and a height of approximately 200 mm was prepared as a transparent conductive film. As a vertical alignment film, a PVM-11 polyimide layer commercially available from HanChem Co. Ltd. was formed on a surface of the ITO layer of the film, HNG730200 (ne: 1.551, no: 1.476, ε∥: 9.6, ε⊥: 9.6, TNI: 100° C., Δn: 0.075, Δε: −5.7) commercially available from HCCH was prepared as liquid crystals, and X12 commercially available from BASF was prepared as an anisotropic dye.

The ITO layer of the transparent conductive film was coated with the vertical alignment film by bar coating, and then calcined at a temperature of 120° C. for an hour to obtain an alignment film having a thickness of 300 nm. The alignment film was rubbed with a rubbing cloth so that the rubbing direction formed an angle of 45° in a clockwise direction with respect to the width axis, thereby preparing a first upper substrate. Thereafter, column spacers having a height of 10 μm and a diameter of 15 μm were disposed on the ITO layer of the same transparent conductive film at intervals of 250 μm, and the ITO layer was coated with the vertical alignment film by bar coating in the same manner, and rubbed so that the rubbing direction formed an angle of approximately 225° in a clockwise direction with respect to the width axis, thereby preparing a first lower substrate. 28 mg of an anisotropic dye was dissolved in 2 g of the liquid crystals, and floating matter was then removed through a pore size 0.2 μm syringe filter made of polypropylene (PP). A sealant was drawn on an upper edge of a surface of an alignment film of the first lower substrate using a seal dispenser. A liquid crystal-dye mixed solution was sprayed on the alignment film of the first lower substrate, the first upper substrate was covered and laminated, and then exposed to ultraviolet (UV) rays at a dose of 1 J (based on the UV-B radiation) using a UV exposure system to prepare a first liquid crystal cell. In this case, the first upper substrate and the first lower substrate were laminated so that the rubbing directions of the first upper substrate and the first lower substrate formed an angle of 180°.

A second upper substrate was prepared in the same manner, except that the rubbing direction was changed during the preparation of the first upper substrate so that the rubbing direction formed an angle of approximately 135° in a clockwise direction with respect to the width axis. A second lower substrate was prepared in the same manner, except that the rubbing direction was changed during the preparation of the first lower substrate so that the rubbing direction formed an angle of approximately 315° in a clockwise direction with respect to the width axis. A second liquid crystal cell was prepared in the same manner as in the preparation of the first liquid crystal cell.

A cell gap of each of the first liquid crystal cell and the second liquid crystal cell was 12 μm, and a pretilt angle of each of the vertical alignment films of the first upper substrate, the first lower substrate, the second upper substrate and the second lower substrate was 88°. The first liquid crystal cell and the second liquid crystal cell thus prepared were laminated by means of an OCA pressure-sensitive adhesive so that the rubbing directions of the first upper substrate and the second upper substrate were perpendicular to each other at an angle of 90°, thereby preparing a transmittance-variable film of Example 1.

Example 2

A transmittance-variable film was prepared in the same manner as in Example 1, except that the pretilt angle of each of the vertical alignment films of the first upper substrate, the first lower substrate, the second upper substrate and the second lower substrate was changed to 82° during the preparation of the transmittance-variable film of Example 1. As such, to control the pretilt angle, a rotary speed (rpm) of the rubbing cloth during rubbing was controlled to be approximately 1,000 rpm, a stage moving speed was controlled to be approximately 1.16 m/min, and a rubbing depth was controlled to be approximately 280 μm.

Example 3

A transmittance-variable film was prepared in the same manner as in Example 1, except that the pretilt angle of each of the vertical alignment films of the first upper substrate, the first lower substrate, the second upper substrate and the second lower substrate was changed to 75° during the preparation of the transmittance-variable film of Example 1. As such, to control the pretilt angle, a rotary speed (rpm) of the rubbing cloth during rubbing was controlled to be approximately 1,000 rpm, a stage moving speed was controlled to be approximately 1.16 m/min, and a rubbing depth was controlled to be approximately 380 μm.

Example 4

A transmittance-variable film was prepared in the same manner as in Example 1, except that a size of the spacer was changed during the preparation of the transmittance-variable film of Example 1 so that the cell gap of each of the first liquid crystal cell and the second liquid crystal cell was 8 μm.

Comparative Example 1

A transmittance-variable film was prepared in the same manner as in Example 1, except that the first liquid crystal cell and the second liquid crystal cell were laminated by means of an OCA pressure-sensitive adhesive during the preparation of the transmittance-variable film of Example 1 so that an angle of approximately 45° was formed between the rubbing directions of the upper substrate and the upper substrate.

Comparative Example 2

A reverse-TN-type liquid crystal-dye film cell was prepared in the same manner as in the preparation of the first liquid crystal cell of Example 1, except that the first upper substrate and the first lower substrate were laminated to each other during the preparation of the first liquid crystal cell of Example 1 so that the rubbing directions of the first upper substrate and the first lower substrate formed an angle of 90° rather than 180°, and a levorotatory chiral dopant was added to the liquid crystals until a pitch reached 100 μm, thereby preparing a transmittance-variable film.

Comparative Example 3

A polarizing plate was laminated by means of an OCA pressure-sensitive adhesive in a direction in which the rubbing direction of the upper substrate of the transmittance-variable film of Comparative Example 2 matched the absorption axis, thereby preparing a transmittance-variable film of Comparative Example 3.

Comparative Example 4

A transmittance-variable film was prepared in the same manner as in Example 1, except that the first upper substrate, the first lower substrate, the second upper substrate and the second lower substrate were aligned by rubbing during the preparation of the transmittance-variable film of Example 1 so that the rubbing directions of the first upper substrate, the first lower substrate, the second upper substrate and the second lower substrate formed angles of 0°, 180°, 90° and 270°, respectively, in a clockwise direction with respect to the width axis.

Evaluation Example 1: Evaluation of Electro-Optical Properties

End portions of the alignment films of the upper substrate and the lower substrate in the liquid crystal cell of the transmittance-variable film were washed with a washing solution obtained by mixing a 2% tetramethylammonium hydroxide (TMAH) aqueous solution and N-methyl-2-pyrrolidone (NMP) at a ratio of 1:9, coated with silver paste, warmed at a temperature of 100° C. for 15 minutes, and then connected to an electrode tape to prepare for a voltage application. In this case, four electrodes were prepared in the case of the transmittance-variable film having a double cell structure, that is, electrode tapes of the first upper substrate and the second upper substrate were connected to form one terminal, and electrode tapes of the first lower substrate and the second lower substrate were connected to form one terminal. Each of the prepared samples was put on a backlight, two electrodes were connected to a terminal of a function generator, and a brightness value was measured using a photodiode by applying a voltage ranging from 0 Vrms to 15 Vrms, thereby determining transmissivity. In this case, an initial brightness value of the backlight was measured, and then converted into a percentage to record a transmissivity value. The contrast ratio was a ratio (Tc/T) of transmissivity (Tc) in a non-voltage-applied state to transmissivity (T) upon application of a voltage of 15 V.

FIG. 7 is a voltage-transmissivity graph plotted for Example 1. The transmissivity is an average transmissivity at wavelengths of 400 nm to 700 nm. As shown in FIG. 7, the transmittance-variable film of Example 1 was in a clear state having a transmissivity of approximately 51.5±0.5% when a voltage was not applied (0 V), and was switched to a dark state having a transmissivity of approximately 2.7±0.1% when a voltage of approximately 15 V was applied. When the voltage was cut off, the transmittance-variable film was again switched to the clear state having a transmissivity of approximately 51.5±0.5%. A hysteresis phenomenon did not occur.

FIG. 8 is a viewing angle-transmissivity graph plotted for Example 1. The transmissivity is an average transmissivity at wavelengths of 400 nm to 700 nm. As shown in FIG. 8, it can be seen that the transmittance-variable film of Example 1 had excellent symmetry of transmissivity at left and right viewing angles.

FIG. 9 is a wavelength-transmissivity graph plotted according to a voltage for Example 4. As shown in FIG. 9, it can be seen that the transmittance-variable film of the present application was configured to secure high transmissivity (transmissivity of normal line light) at a medium voltage, compared to that at the maximum voltage.

The following Table 1 lists initial transmittances when a voltage is not applied, initial transmittances when a voltage of 15 V is applied, and contrast ratios for the transmittance-variable films of Examples 1 to 3 and Comparative Examples 1 to 3. From the results listed in the following Table 1, it can be seen that the transmittance-variable films of Examples 1 to 3 exhibited excellent initial transmittance and had a high contrast ratio as well.

TABLE 1

|  | Initial transmittance (0 V) | Light-shielding transmittance (15 V) | CR ratio |
|---|---|---|---|
| Example 1 | 51.5% | 2.7% | 19.1 |
| Example 2 | 47.3% | 2.6% | 18.2 |
| Example 3 | 42.5% | 2.6% | 16.3 |
| Comparative Example 1 | 51.5% | 9.4% | 5.5 |
| Comparative Example 2 | 70.2% | 32.1% | 2.2 |
| Comparative Example 3 | 24.5% | 1.3% | 18.8 |

The following Table 2 lists transmissivities measured for the transmittance-variable films of Example 1 and Comparative Example 4 at the front and a left/right viewing angle of 30°. From the results listed in the following Table 2, it can be seen that the transmittance-variable film of Example 1 has superior bilateral symmetry since the transmittance-variable film had a slight difference in transmittance between the left and right viewing angles, compared to the transmittance-variable film of Comparative Example 4.

TABLE 2

|  | Example 1 | | Comparative Example 4 | |
|---|---|---|---|---|
|  | 0 V | 15 V | 0 V | 15 V |
| Transmittance (Front) | 51.5% | 2.7% | 51.4% | 2.6% |
| Transmittance (left viewing angle of 30°) | 40.7% | 2.6% | 39.5% | 2.6% |
| Transmittance (right viewing angle of 30°) | 40.1% | 2.6% | 42.7% | 2.6% |

The following Table 3 lists the results obtained by irradiating the transmittance-variable films of Examples 1 to 3 with incident light of a backlight so that the incident light formed an angle of approximately 30° with respect to the surface normal line of each of the transmittance-variable films and measuring initial transmittances, light-shielding transmittances and contrast ratios. From the results listed in the following Table 3, it can be seen that, when the transmittance-variable film was installed in the eyewear at a tilt angle, the contrast ratio at the tilt angle was able to be improved by adjusting the pretilt angle of a vertical alignment film.

TABLE 3

|  | Initial transmittance (tilt angle of 30°) | Light-shielding transmittance (15 V) | CR ratio |
| --- | --- | --- | --- |
| Example 1 | 43.2% | 2.7% | 16 |
| Example 2 | 46.3% | 2.6% | 17.8 |
| Example 3 | 49.6% | 2.6% | 19.1 |

What is claimed is:

1. A transmittance-variable film comprising a first liquid crystal cell comprising a first guest-host liquid crystal layer; and a second liquid crystal cell comprising a second guest-host liquid crystal layer,
wherein the first and second liquid crystal cells are included to overlap each other,
each of the first and second liquid crystal cells is switchable between vertically aligned and horizontally aligned states, and
the first liquid crystal cell in the horizontally aligned state has an optical axis ranging from 40° to 50° in a clockwise direction with respect to a width axis of the first liquid crystal cell, and the second liquid crystal cell in the horizontally aligned state has an optical axis ranging from 130° to 140° in a clockwise direction with respect to a width axis of the second liquid crystal cell,
wherein the width axis is parallel to a major-axis of the respective liquid crystal cell,
wherein the first liquid crystal cell sequentially comprises a first vertical alignment film, the first guest-host liquid crystal layer, and a second vertical alignment film, and
the second liquid crystal cell sequentially comprises a third vertical alignment film, the second guest-host liquid crystal layer, and a fourth vertical alignment film, and
wherein the first to fourth vertical alignment films have a pretilt angle ranging from 70° to 89°, a pretilt direction of each of the first and second vertical alignment films is in a range of 40° to 50° in a clockwise direction with respect to a width axis direction of the first liquid crystal cell, and a pretilt direction of each of the third and fourth vertical alignment films is in a range of 130° to 140° in a clockwise direction with respect to a width axis direction of the second liquid crystal cell.

2. The transmittance-variable film of claim 1, wherein each of the first and second guest-host liquid crystal layers comprises liquid crystals and an anisotropic dye.

3. The transmittance-variable film of claim 2, wherein the liquid crystals have a negative dielectric anisotropy.

4. The transmittance-variable film of claim 1, wherein the first or second guest-host liquid crystal layer has a degree of anisotropy (R) of 0.5 or more.

5. The transmittance-variable film of claim 1, wherein a rubbing direction of the first vertical alignment and a rubbing direction of the second vertical alignment film are opposite to each other and a rubbing direction of the third vertical alignment and a rubbing direction of the fourth vertical alignment film are opposite to each other.

6. The transmittance-variable film of claim 1, further comprising an electrode film disposed on outer sides of the first to fourth vertical alignment films.

7. The transmittance-variable film of claim 1, wherein the first and second liquid crystal cells are present in a state of being laminated to each other.

8. Eyewear comprising a lens for the left eye; a lens for the right eye; and a frame configured to support the lenses for the left and right eyes,
wherein each of the lens for the left eye and the lens for the right eye comprises the transmittance-variable film defined in claim 1,
the frame is formed so that an angle formed between a front view direction of an observer and a normal line of a surface of the transmittance-variable film when the observer wears the eyewear is in a range of 15° to 40°.

9. The eyewear of claim 8, wherein the eyewear is a device for experiencing augmented realities.

* * * * *